Feb. 2, 1971   B. BERL   3,560,996
CHECK BARRIER MECHANISM
Filed Oct. 2, 1969
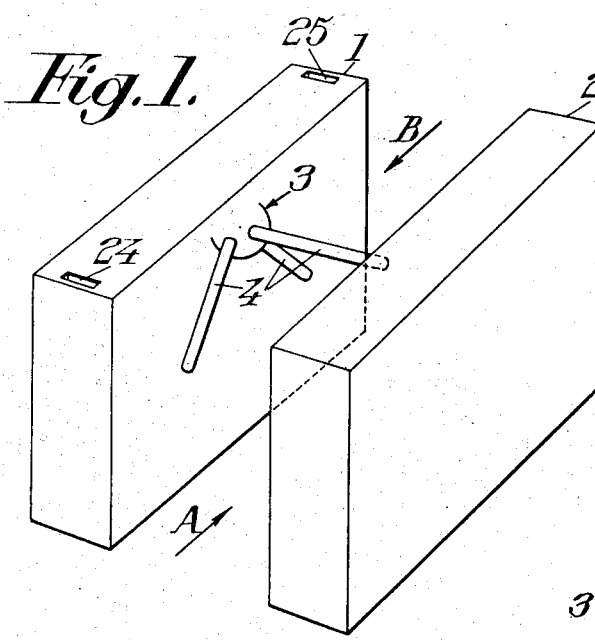
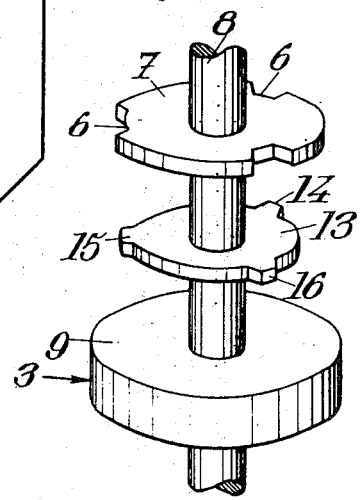
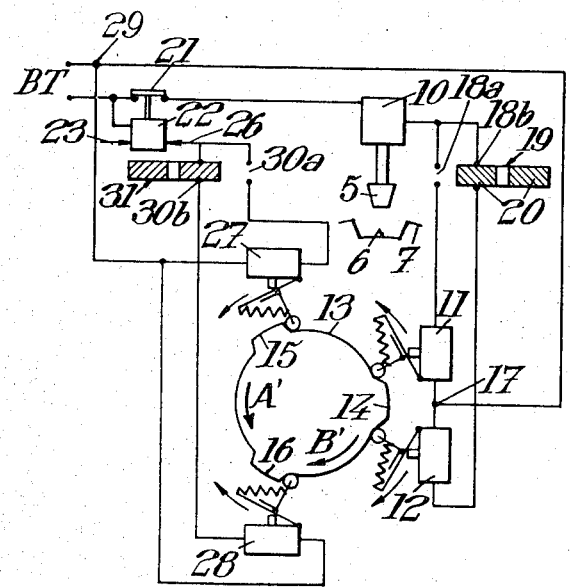

United States Patent Office 3,560,996
Patented Feb. 2, 1971

3,560,996
CHECK BARRIER MECHANISM
Bernard Berl, Paris, France, assignor to Etablissements
Georges Klein, Paris, France, a society of France
Filed Oct. 2, 1969, Ser. No. 863,242
Claims priority, application France, Oct. 2, 1968,
168,519
Int. Cl. E06b *11/08;* E05b *65/00*
U.S. Cl. 49—35                                         9 Claims

ABSTRACT OF THE DISCLOSURE

A check barrier mechanism for supervising the passage therethrough of a person or inanimate object comprises a mechanical barrier element which, in its normal resting position is unlocked and which, when an unauthorized person or object attempts to pass said barrier element, is automatically locked upon initial displacement of said barrier element by said unauthorized object. The mode of operation of the mechanism may be readily varied to suit any one of several applications which include the provision of free passage in one or each direction, prohibited passage in one or each direction and passage subject to the establishment of right of way, by for example payment, in one or each direction.

---

The invention concerns a check barrier mechanism for supervising the passage therethrough of an animate or inanimate object and relates more particularly, but not exclusively, to a mechanism used for supervising the passage of persons through a passageway in at least one of two directions such as may be used in public transport installations and the like.

In the known devices of this type a mechanical barrier element is locked in its normal closed position and is unlocked only when right of way is established by, for example, the introduction of a ticket or coin into an appropriate slot. These devices, besides their mechanical complexity, have the disadvantage that the passageway remains blocked in the event of a current failure. Moreover it is very difficult to modify the manner of operation of such known devices so as to, for example, allow passage on payment in one direction and prohibit passage in the other direction.

It is the object of the invention to render such devices more adaptable to practical requirements.

A feature of the invention is that a locking element is arranged and controlled in such a way that a mechanical barrier element which may take the form of a turnstile with several arms or a tip-up or telescopic barrier, is normally unlocked at rest and may be automatically locked by initial displacement of said barrier element when an unauthorised object attempts to pass said barrier element.

The invention is further described, by way of example, with reference to the accompanying drawings, in which:

FIG. 1 is a perspective view of a mechanism constructed in accordance with one embodiment of the invention, FIG. 2 is a schematic view of locking means for a mechanical barrier element of the mechanism, FIG. 3 is a perspective view showing a mechanical component of the mechanism, and FIG. 4 shows a barrier arm of the turnstile type which may be used in a variant of the mechanism.

Referring to FIG. 1 of the drawings, two lateral blocks 1 and 2 define a passageway which is obstructed by a mechanical barrier element 3 of the turnstile type with for example, three branches 4.

The invention provides a mechanism having locking means arranged such that the barrier element 3 is normally unlocked, that is to say free to turn in both directions, and remains so when it is acted upon by an authorized user, but is locked when acted upon by a nonauthorized user.

For this purpose means are provided which detect initial movement of the barrier element 3 when acted upon by a user. Such a detecting means may be of any kind (electrical, hydraulic, pneumatic, mechanical, or actuated by photoelectric cells); in a preferred embodiment however, electrical means are used.

As shown by FIGS. 2 and 3 the locking means includes a bolt 5 which can immobilize the barrier element 3 by engaging notches 6 in a disc 7 connected to the barrier element 3 and preferably keyed onto a shaft 8 integral with a hub 9 of the barrier element 3.

The bolt 5 is actuable by an electromagnet 10 in such a manner that in a normal rest position (electromagnet nonexcited) the bolt 5 is in a disengaged position from the disc 7, that is to say that the barrier element 3 is unlocked.

The electromagnet 10 is excited only when a nonauthorized user actuates the mechanism. Authorization of passage may be one of two kinds: it may either be permanent in a direction of free passage, or it may be granted by, for example, payment.

Initial movement of the barrier element 3 is detected by one of two micro-switches 11 and 12, each one being associated with one sense of rotation of the barrier element 3. The micro-switches 11 and 12 are mechanically actuable by a disc 13 which has three equally-spaced cams 14, 15 and 16 and is keyed onto the shaft 8 (FIGS. 2 and 3).

The micro-switches 11 and 12 are of the unidirectional type, that is to say that each one of them is actuated only during one direction of movement of the disc 13. This type of micro-switch is well known and will not therefore be further described. The direction of movement of the disc 13 which actuates a given micro-switch 11 or 12 is shown in FIG. 2 by an arrow.

The micro-switches 11 and 12 have a common terminal 17 connected directly to one pole of an electrical source BT. The other two terminals of the micro-switches 11 and 12 are connected respectively to two changeover switches 18a and 18b of for example, the bar type 19, which in turn are connected to one terminal of the electromagnet 10. The other terminal of the electromagnet 10 is connected to the other pole of the source BT, with the interposition of a normally closed switch 21.

The cam followers of the micro-switches 11 and 12 are in their normal rest positions, situated adjacent to and on either side of the cam 14 so that one or the other will be actuated by the cam 14 as soon as the disc 13 turns in one or the other of the two directions A' and B' which correspond to the directions of passages A and B (FIG. 1) respectively.

The mechanism operates in the following manner:

The bar 19 may occupy one of four operating positions corresponding to the simultaneous closing of both of the switches 18a and 18b, to their simultaneous opening and to the closing of one or the other only. If one of the switches 18a or 18b is open, the associated micro-switch 11 or 12 is inoperative in that the electromagnet 10 cannot be excited. Thus, in FIGS. 1 and 2 the switch 18a is open so that the direction A is free.

If the switch 18b is open, it will of course be the direction B that will be free. If both switches 18a and 18b are open (bar 19 withdrawn), both directions A and B will be free.

Thus an open switch 18a and/or 18b gives permanent right of way in one or both directions.

Conversely, when the bar 19 closes a switch 18a or 18b, the corresponding direction of passage is blocked.

As will be seen, such passage may be subject to authorization or it may be prohibited.

In the particular embodiment considered, authorization for passage are given by a memory unit 22 which receives on the one hand, by a line 23, authorization signals processed in a system which checks the vouchers, coins, etc. presented by users at 24 or 25, some of these signals authorizing several successive passages, and receives, on the other hand by a line 26, deduction pulses reducing automatically by one unit for each user the number of authorizations paid and balance to be used. The balance in the memory unit 22 affects the operation of the apparatus by way of a switch 21 which is closed for a zero balance and open for a positive balance of authorizations stored in the memory unit 22.

A deduction circuit comprises two unidirectional micro-switches 27 and 28, two common terminals of which are connected at 29 to a pole of the source BT, the two other terminals being connected respectively to two change-over switches 30a and 30b. The other terminals of the switches 30a and 30b are connected to the line 26.

The cam followers of the micro-switches 27 and 28 are situated immediately adjacent to cams 15 and 16 on the disc 13 so as to be respectively actuable at the end of the travel of the disc 13, by the preceding cam 14, 15 or 16 depending on the direction of rotation of the disc 13.

Thus in the arrangement of FIG. 2, the cam 14 actuates the micro-switches 27 and 28 respectively in the directions A′ and B′ of rotation of the disc 13 at the end of an angular displacement of 120 degrees.

The bar 31, like the bar 19, may also occupy one of four positions corresponding to the simultaneous closing of the two switches 30a and 30b, to their simultaneous opening and to the closing of only one or other. If one switch 30a or 30b is closed, the memory unit 22 will receive a deduction pulse when the corresponding micro-switch 27 or 28 is actuated. Thus, in FIG. 2, such deduction pulses are caused by the micro-switch 28 when the disc 13 turns in the sense B′, at the end of its angular displacement of 120°.

It can be seen that the micro-switches 11 and 27 are associated with the direction A′ of rotation of the disc 13, that is to say with the direction A of passing the barrier element 3, and that the micro-switches 12 and 28 are associated with the direction B of passing the barrier element 3. A switch 18a or 18b is open for a permanent authorization of passage in the corresponding direction A or B and is closed either for a permanent prohibition, or for passage subject to a check. A switch 30a or 30b is open when the corresponding direction A or B is not subject to a check (that is to say it is free or prohibited), and is closed when this direction is subject to a check.

In the embodiment described, the disc 13 turns through the same angle as the barrier element 3, that is to say by 120° so that after each passage the cam followers of the micro-switches 11, 12, 27 and 28 occupy their initial positions in relation to the cams 14, 15 and 16.

To provide a free passage in both directions A and B the bar 19 is withdrawn and the slots 24 and 25 are shut. The circuit incorporating the electromagnet 10 is thus permanently open at 18a and 18b and the barrier element 3 is never locked.

For a free passing in the direction A and total prohibition in the direction B, the switch 18a is opened, the switch 18b is closed (FIG. 2) and the slots 24 and 25 are shut. When the barrier element 3 is pushed in the direction A′, the micro-switch 11 closes but the circuit incorporating the electromagnet 10 remains open at 18a and the barrier element 3 can turn. In the direction B′, the micro-switch 12 is closed, thus exciting the electromagnet 10. Initially the locking disc 7 turns a few degrees; this is why, as shown in FIG. 2, the notches 6 are wider than the bolt 5, until the bolt 5 engages a notch 6 and immobilizes the barrier element 3. When pushing on an arm 4 ceases, the barrier element 3 is returned to its stable equilibrium position by any suitable mechanism so opening the micro-switch 12 and causing unlocking.

For free passage in the direction A and passage subject to payment in the direction B, the slot 24 is shut, the slot 25 is open, the bar 19 remains in the position described in the preceding paragraph, the switch 30a is open and the switch 30b is closed. Passage in direction A occurs as described above and, when the cam 14 closes the micro-switch 27, there is no deduction pulse because the deduction circuit is open at 30a. In the direction B, if the user has not paid his due, the switch 21 remains closed, the electromagnet 10 is excited, and the barrier element 3 is locked. If the user has paid, the switch 21 opens and the circuit incorporating the electromagnet 10 thus is broken. When the authorized user has passed through the cam 14 closes the micro-switch 28, so that a deduction pulse is passed to the memory unit 22 which again closes the switch 21 if only a single right of way has been paid. If several such rights have been paid, the balance in the memory unit 22 diminishes by one unit but remains positive and the switch 21 remains open.

For passage subject to payment in both directions, it is only necessary, referring to the settings described in the preceding paragraph, to open the slot 24 and to close the switches 18a and 30a. The operation is then the same in both directions A and B and may be deduced from the preceding paragraph.

For prohibition in direction A and passage subject to payment in the direction B, it is sufficient, in relation to the preceding case to close the slot 24 and to open the switch 30a. The operation can be deduced from the preceding case.

Finally, for prohibition in both directions, it is sufficient, in relation to the preceding case, to close the slot 25 and to open the switch 30b, so that the switch 21 remains closed the whole time. Thus whenever the turnstile is acted on it will become locked.

The same applies if, in these various types of application, the directions A and B ar reversed.

If required, gearing down may be established between the hub 9 and the disc 13 so as to make the latter turn one revolution at each passage. A single cam such as 14 is then sufficient on the disc 13, the micro-switches 27 and 28 being then placed in the same position in relation to the cam 14 as that which they occupied in relation to cams 15 and 16 respectively. The micro-switches 27 and 28 could also be actuable by another single-cam disc integral with the disc 13.

In FIG. 4 is shown a modification of the means for detecting initial movement of the barrier element 3. In this case, detection takes place at the arms of the element 3 rather than at the hub 9. Each arm 4 of the embodiment of FIG. 4 comprises a rigid framework 32 on which is displaceably fitted at 33 a casing 34. The frame 32 has at its free end two micro-switches 111 and 112 of the unidirectional type which are selectively closed when a user pushes against the arm in the direction A or B (FIG. 4). The micro-switches 111 and 112 are connected in parallel between the terminal 17 and the switches 18a and 18b in an analogous way to the arrangement shown in FIG. 2. Deduction is effected in the same manner as has previously been described.

In applications where one direction of passage is subject to payment and the other is prohibited or subject to payment, two separate memory units 22 may be provided, each one checking one of the two directions, each of the memory units 22 being associated with one deduction micro-switch 27 or 28 and with a checking unit for vouchers, coins etc. The switches, such as 21, of the two memory units would be arranged between the micro-switches 11 or 12 (or 111 or 112) and the switches 18a or 18b respectively. Thus it would be possible to avoid a situation wherein a paying user, having paid his due but not yet having effected his passage, makes it possible for a non-authorized user to pass in the reverse direction.

A mechanism constructed in accordance with the invention has numerous advantages, such as the following;

simplicity of construction and of operation, a wide range of applications by simple changeover switching, safety, since in the event of current failure the passageway remains free.

It will be understood that the invention is by no means limited to the embodiments which have been specifically described; it embraces on the contrary any number of modifications, for example, a mechanism which may be used in automatic handling installations where the authorization for passage is given from a distance by an official in charge. It is also possible for the switch 21 (or each of the switches 21) to be controlled by a system which takes into account only whether or not a particular passage has or has not been authorized, that is each passage has to be paid for individually.

I claim:

1. A check barrier mechanism for supervising the passage therethrough of an animate or inanimate object comprising a mechanical barrier element having a resting position in which it obstructs passage of said object, a locking element movable from a normal position to a locking position in which said barrier element is locked in said resting position, said barrier element being unlocked when said locking element is in said normal position to permit an object to displace said barrier element and permit passage of said object past said barrier element detector means responsive to the attempt of an object to pass said barrier element without authorization for moving said locking element into said locking position, and control means adapted to receive an authorization signal for rendering said detector means inoperable to move said locking element.

2. A mechanism according to claim 1 wherein said barrier element comprises a turnstile with a plurality of arms.

3. A mechanism according to claim 2 including a member which is connected to said barrier element and which has at least one notch and wherein said locking element comprises a bolt which is narrower than said notch and is adapted to cooperate with said notch.

4. A mechanism according to claim 3 including a shaft connected to said barrier element and wherein said member which has at least one notch comprises a first disc formed integrally with said shaft.

5. A mechanism according to claim 4 further comprising an electrical circuit which incorporates an electromagnet for urging said locking element into said locking position, two micro-switches arranged in parallel and selectively actuable during respective directions of displacement of said barrier element on initial displacement of said barrier element and, connected in series with each of said micro-switches, a switch which is not actuable by said object and which is operable to break said electrical circuit so as to render the associated micro-switch inoperable.

6. A mechanism according to claim 5 including a second disc which is integral with said shaft and which has at least one cam for actuating said micro-switches.

7. A mechanism according to claim 5 wherein said micro-switches are mounted in said arms of said turnstile and wherein each of said arms has an outer casing displaceable relatively to its associated arm, said micro-switches being actuable by such relative displacement.

8. A mechanism according to claim 5 further comprising two further micro-switches connected in parallel and selectively actuable during respective directions of displacement of said barrier element at the termination of said displacement so as to emit deduction signals, and at least one memory unit for receiving said deduction signals and said authorization signals, the memory unit having a switch operable to close and break said electrical circuit.

9. A mechanism according to claim 7 including a switch connected in series with each of said further micro-switches, said switches not being actuable by said object and being operable to cancel the effect of their respective micro-switches.

References Cited

UNITED STATES PATENTS

| | | | |
|---|---|---|---|
| 2,176,848 | 10/1939 | Odell | 49—47 |
| 2,714,264 | 8/1955 | Odell | 49—47X |
| 3,383,797 | 5/1968 | Trikilis | 49—47 |
| 3,386,202 | 6/1968 | Crews et al. | 49—35 |
| 3,397,486 | 8/1968 | Foxwell et al. | 49—35X |
| 3,445,962 | 5/1969 | Byland et al. | 49—47 |

DENNIS L. TAYLOR, Primary Examiner

U.S. Cl. X.R.

49—47